(12) United States Patent
He et al.

(10) Patent No.: US 10,697,681 B2
(45) Date of Patent: Jun. 30, 2020

(54) HEAT PUMP SYSTEM WITH MULTI-WAY-POSITION VALVE

(71) Applicant: Ford Global Technologies, LLC, Dearborn, MI (US)

(72) Inventors: Jing He, Novi, MI (US); Loren John Lohmeyer, Monroe, MI (US); William Stewart Johnston, South Lyon, MI (US); Angelo Patti, Pleasant Ridge, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 15/877,432

(22) Filed: Jan. 23, 2018

(65) Prior Publication Data

US 2019/0226737 A1   Jul. 25, 2019

(51) Int. Cl.
*F25B 49/02* (2006.01)
*B60H 1/32* (2006.01)
(Continued)

(52) U.S. Cl.
CPC ....... *F25B 49/022* (2013.01); *B60H 1/00814* (2013.01); *B60H 1/00907* (2013.01); *B60H 1/3205* (2013.01); *F25B 13/00* (2013.01); *F25B 29/003* (2013.01); *F25B 40/00* (2013.01); *B60H 2001/00935* (2013.01); *F25B 9/008* (2013.01); *F25B 2313/027* (2013.01); *F25B 2400/13* (2013.01); *F25B 2400/23* (2013.01)

(58) Field of Classification Search
CPC .. F25B 49/022; B60H 1/3205; B60H 1/00814
See application file for complete search history.

(56) References Cited

U.S. PATENT DOCUMENTS

| 4,306,422 A | * | 12/1981 | Korycki | ................ F25B 13/00 137/625.43 |
| 4,441,335 A | | 4/1984 | Bonne | |

(Continued)

FOREIGN PATENT DOCUMENTS

EP            1472106 A1    11/2004
WO   WO-2017145219 A1 *  8/2017  ............. F25B 13/00

OTHER PUBLICATIONS

REXROTH Bosch Group, 8-2 ways/positions flow diverters, RE 18302-13/07.12, replaces 12.09, L765 (VS 570-VS575).

*Primary Examiner* — Ana M Vazquez
(74) *Attorney, Agent, or Firm* — David Coppiellie; Brooks Kushman P.C.

(57) ABSTRACT

A vehicle heat pump system including a thermal loop, an eight-way valve, and a controller is provided. The thermal loop includes a compressor, a first portion, and a second portion. The first portion includes an outside heat exchanger. The second portion includes a cabin heat exchanger. The eight-way valve is downstream of the compressor and has a first position in which refrigerant flows within the portions in a cooling mode and a second position in which refrigerant flows within the portions in a heating mode. The controller switches the eight-way valve between the first and second positions. The outside heat exchanger operates as a condenser in the cooling mode and the eight-way valve directs refrigerant flow from the outside heat exchanger to the cabin heat exchanger.

11 Claims, 4 Drawing Sheets

(51) Int. Cl.
   *B60H 1/00*   (2006.01)
   *F25B 29/00*  (2006.01)
   *F25B 13/00*  (2006.01)
   *F25B 40/00*  (2006.01)
   *F25B 9/00*   (2006.01)

(56) References Cited

U.S. PATENT DOCUMENTS

| | | | |
|---|---|---|---|
| 9,499,026 B2 | 11/2016 | Brodie et al. | |
| 2007/0251256 A1* | 11/2007 | Pham | F04C 29/042 62/324.1 |
| 2014/0223943 A1* | 8/2014 | Ichishi | B60H 1/3205 62/215 |

* cited by examiner

HEAT PUMP SYSTEM WITH MULTI-WAY-POSITION VALVE

TECHNICAL FIELD

The present disclosure relates to a heat pump system for assisting in managing thermal conditions of a vehicle.

BACKGROUND

Air-to-air heat pump systems may require complex control systems, have high costs due to additional hardware needed, and may operate with a charge imbalance under cooling and heating modes due to different sizes of indoor and outdoor condensers.

SUMMARY

A vehicle heat pump system includes a thermal loop, an eight-way valve, and a controller. The thermal loop includes a compressor, a first portion, and a second portion. The first portion includes an outside heat exchanger. The second portion includes a cabin heat exchanger. The eight-way valve is downstream of the compressor and has a first position in which refrigerant flows within the portions in a cooling mode and a second position in which refrigerant flows within the portions in a heating mode. The controller switches the eight-way valve between the first and second positions. The outside heat exchanger operates as a condenser in the cooling mode and the eight-way valve directs refrigerant flow from the outside heat exchanger to the cabin heat exchanger. The outside heat exchanger operates as an evaporator in the heating mode and the eight-way valve directs refrigerant flow from the cabin heat exchanger to the outside heat exchanger. The system may also include an airside heater. The system may further include an airside heater to supplement heat for delivery to a vehicle cabin in the heating mode when a sensor detects a temperature below a predetermined threshold or to reheat dehumidified air to a predetermined temperature in a dehumidification and reheat mode. The system may also include a blend door to control temperature of air supplied to the vehicle cabin. The portions may further include an expansion device to reduce a pressure of refrigerant flow, an internal heat exchanger upstream of the expansion device, a flash tank downstream of the expansion device to separate vapor-liquid mixture, and a control valve downstream of the flash tank to balance a pressure of the refrigerant flowing from the flash tank and the eight-way valve. The eight-way valve may include a valve housing having eight ports. The eight-way valve may be arranged with the first portion and the second portion to influence a transitioning phase state of the refrigerant in which components of the portions are arranged with one another to influence a transitioning phase state of the refrigerant in which the refrigerant is in a liquid or liquid-vapor mixture form when flowing toward the cabin heat exchanger in the cooling mode and the refrigerant is in a vapor form when flowing toward the cabin heat exchanger in the heating mode. The refrigerant may be one of R134a, R1234yf, R152a, R410A, hydrocarbons, ammonia, and R744. The second portion of the thermal loop may further include a flash tank arranged with the eight-way valve to substantially remove vapor from the refrigerant such that the refrigerant is substantially entirely liquid when entering the cabin heat exchanger in the cooling mode or entering the outside heat exchanger in the heating mode. The thermal loop may include only two heat exchangers and only one expansion device.

A vehicle heat pump system includes a compressor configured to increase refrigerant pressure through an outside heat exchanger in a cooling mode that defines a first position of a multi-position valve, and to increase refrigerant pressure through a cabin heat exchanger in a heating mode that defines a second position of the multi-position valve. The compressor and multi-position valve are arranged such that refrigerant pressure is substantially same in the cooling and heating modes. The system may include an expansion device, a flash tank, and a control valve arranged with one another to balance a pressure of refrigerant flowing into and out of the heat exchangers. The system may include a sensor, a controller, and an airside heater in fluid communication with the cabin heat exchanger. The controller may be programmed to activate the airside heater to provide supplemental heat to a vehicle cabin responsive to the sensor detecting a temperature below a predetermined threshold. Refrigerant associated with the refrigerant pressure may be one of R134a, R1234yf, R152a, R410A, hydrocarbons, ammonia, and R744. The flash tank may be arranged with the multi-position valve such that refrigerant is substantially entirely liquid when entering the cabin heat exchanger in the cooling mode. The system may include only two heat exchangers and only one expansion device.

A vehicle heat pump system includes a pair of conduit portions of a thermal loop and components in fluid communication with one another including only one internal heat exchanger, a compressor, an outside heat exchanger, a cabin heat exchanger, only one expansion device, a flash tank, only one control valve, and an eight-way valve arranged within the pair of conduit portions to switch between a first position in a cooling mode and a second position in a heating mode. Refrigerant flows directly from the outside heat exchanger to the internal heat exchanger in the cooling mode and the refrigerant flowing from the outside heat exchanger in the heating mode is pressure-balanced by the only one control valve en route to the internal heat exchanger in the heating mode. The refrigerant may flow directly from the compressor to the outside heat exchanger in the cooling mode and the refrigerant may flow directly from the compressor to the cabin heat exchanger in the heating mode. The system may further include an airside heater. The airside heater may supplement heat distribution to a vehicle cabin in the heating mode when the cabin heat exchanger operates as a condenser or reheats the dehumidified air to a predetermined temperature in the dehumidification and reheat mode when the cabin heat exchanger operates as an evaporator. The outside heat exchanger may operate as a condenser in the cooling mode and may operate as an evaporator in the heating mode. The flash tank may be arranged with the eight-way valve such that refrigerant flowing to the cabin heat exchanger in the cooling mode or to the outside heat exchanger in the heating mode is substantially only liquid. The eight-way valve may include a valve housing having eight ports, a first pair of the eight ports may be disposed on a first side of the valve housing located opposite a second pair of the eight ports disposed on a second side of the valve housing. Four ports of the eight ports are disposed on a third side of the valve housing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Under certain conditions, electrified vehicles, such as BEVs and PHEVs, may need an alternative source of heat to replace or augment an amount of heat rejected by a traditional internal combustion engine to meet vehicle cabin heating targets. Vapor compression heat pump (VCHP) technology may provide vehicle cabin heating by extracting energy from the vehicle's ambient environment. A heat pump system may extend drive range by up to thirty percent in comparison to other heat systems using high voltage positive temperature coefficient (HV-PTC) heaters or phase-change material (PCM) heat storage.

Figure 1:
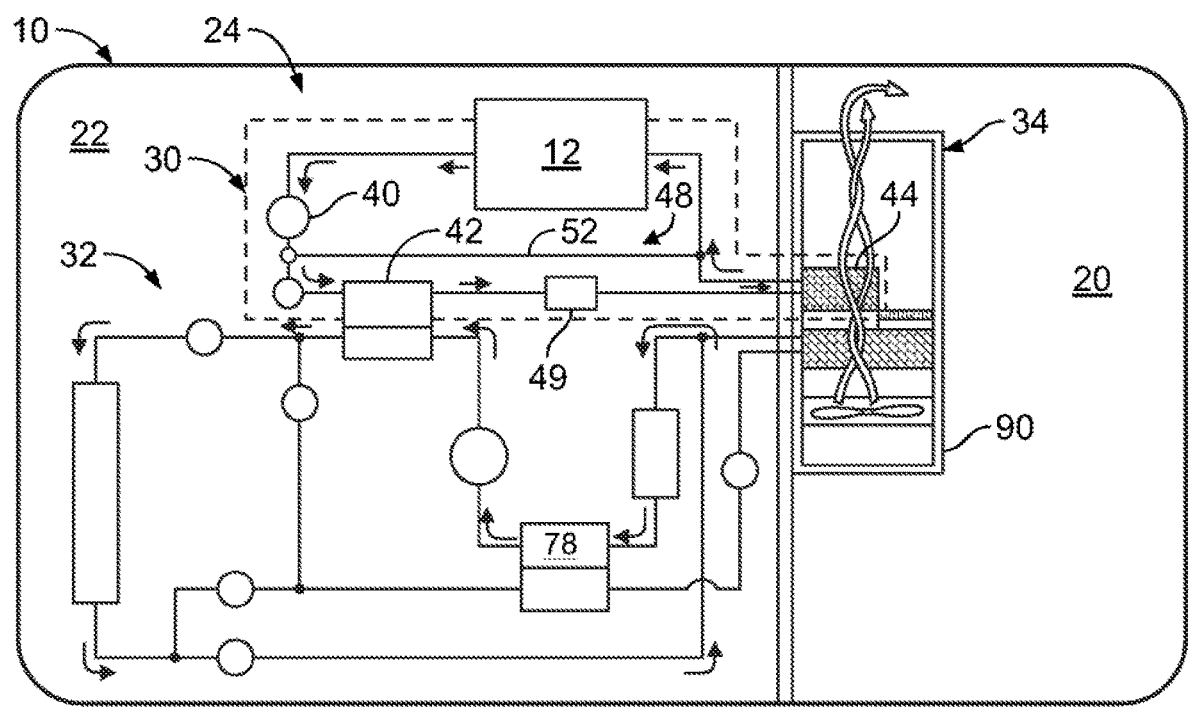
FIG. 1 is a schematic representation of an example of an electrified vehicle.

FIG. 1 is a schematic representation of an example of an electrified vehicle 10. The vehicle 10 may include one or more power sources 12 that may be used to propel the vehicle 10 and/or power vehicle components. The vehicle 10 may include a passenger compartment 20, an engine compartment 22, and a heat pump system 24. The heat pump system 24 may include a coolant subsystem 30, a refrigerant subsystem 32, and a ventilation subsystem 34.

The coolant subsystem 30 may circulate a fluid, such as coolant, to cool the power source 12. The coolant subsystem 30 may include a coolant pump 40, an intermediate heat exchanger 42, a heater core 44, and a bypass loop 48 that may be fluidly interconnected by conduits. The coolant subsystem 30 may include a secondary heat source 49. The secondary heat source 49 may be, for example, a positive temperature coefficient (PTC) heater. In a vehicle embodiment including an engine, the engine may also operate as a secondary heat source.

The refrigerant subsystem 32 may include a compressor 60, a first control valve 62, a first expansion device 64, an exterior heat exchanger 66, a second control valve 68, a third control valve 70, an accumulator 72, a second expansion device 74, an interior heat exchanger 76, and an optional internal heat exchanger 78. Components of the heat pump subsystem 32 may be fluidly connected in a closed loop via one or more conduits.

Compared to a conventional air conditioning and heating system, the heat pump system in FIG. 1 includes at least one more heat exchanger (e.g. the intermediate heat exchanger 42), one expansion device (e.g. the expansion device 64), and multiple control valves (e.g. valves 62, 68, 70). The added hardware increases system cost and control complexity.

Figure 2:
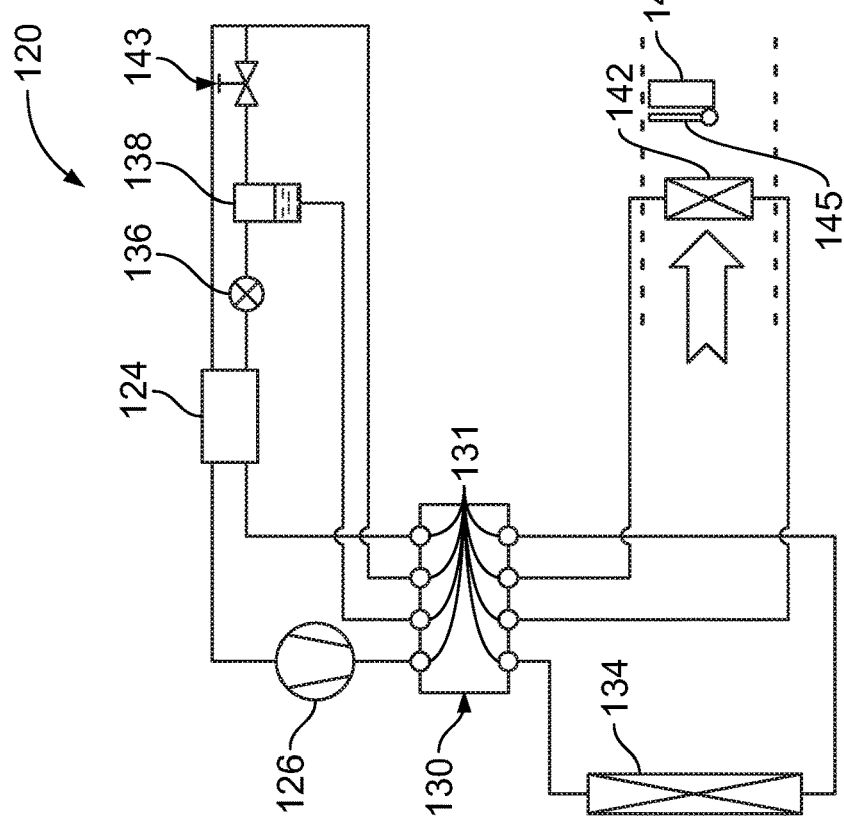
FIG. 2 is a schematic representation of a vehicle heat pump system.

FIG. 2 is a schematic representation of a vehicle heat pump system including an eight-way-two-position valve, referred to generally as a heat pump system 120. A thermal loop of the heat pump system 120 includes components to assist in managing thermal conditions of a vehicle. The heat pump system 120 may include a heat exchanger 124, at least one compressor 126, an eight-way valve 130, an outside heat exchanger 134, a cabin heat exchanger 142, and an expansion device 136. The compressor 126 may be powered by an electrical or non-electrical power source and operate to compress a low-pressure state of the refrigerant to a high-pressure state prior to entering an eight-way-two-position valve (the eight-way valve 130).

Figure 3:
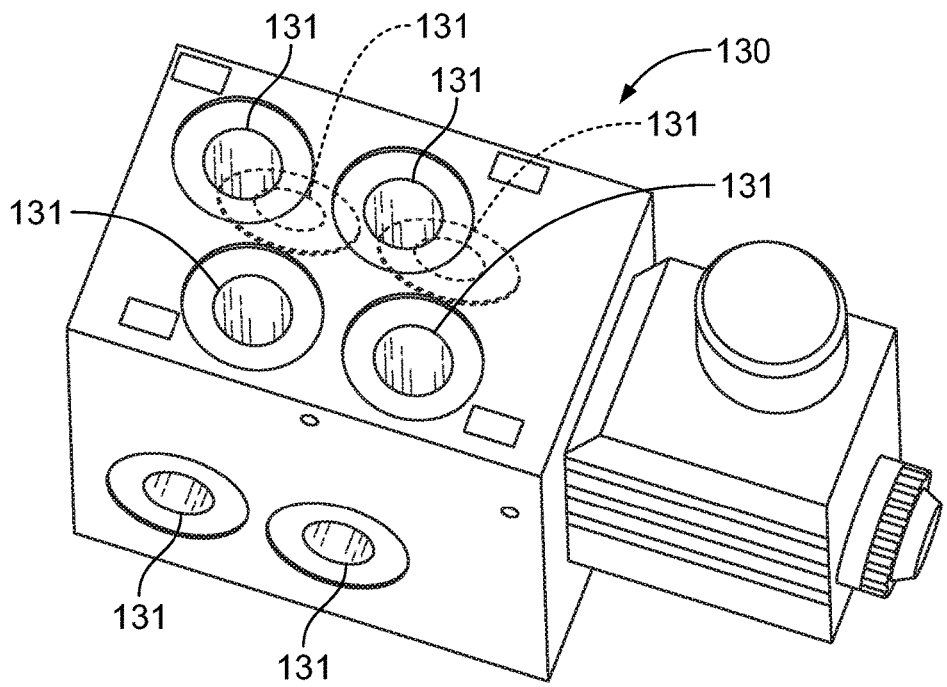
FIG. 3 is a perspective view of an example of an eight-way-two-position valve of the vehicle heat pump system of FIG. 2.

FIG. 3 illustrates a detailed view of one example of a structure for the eight-way valve 130. In FIG. 3, two of ports 131 of the eight-way valve 130 are not visible but shown in broken lines. Various configurations are available to orient the eight-way valve 130 within a heat pump system such as the heat pump system 120. For example, the ports 131 of the eight-way valve 130 may be configured to direct fluid between each of the eight ports 131. Values of the low-pressure state and the high-pressure state will vary based on refrigerant type, components of the heat pump system 120, and passenger selected inputs. The outside heat exchanger 134 functions as a condenser to reject heat to the ambient air in a cooling mode and as an evaporator to absorb heat from the ambient air in a heating mode. The cabin heat exchanger 142 functions as an evaporator to cool the incoming airflow in a cooling mode and as a condenser to heat the incoming airflow in a heating mode before supplying the airflow to the cabin. The expansion device 136 may be a fixed orifice tube (FOT), a thermal expansion device (TXV), or an electronic expansion device (EXV).

The heat pump system 120 may further include a flash tank 138 to separate the vapor-liquid mixture after the expansion device 136 and to supply liquid refrigerant to the cabin heat exchanger 142, an airside heater 144 as a supplemental heat source, a temperature blend door 145, a control valve 143 to allow vapor refrigerant to merge with the outlet refrigerant from the evaporator, and the heat exchanger 124 to enhance the system efficiency.

While various types of refrigerant may be used with the heat pump system 120, non-limiting examples of the refrigerant include R134a, R1234yf, R410A, hydrocarbons, ammonia, R744, and R152a.

The heat pump system 120 improves energy efficiency, simplifies control logic, and reduces cost by eliminating a number of components in comparison to previous heat system architectures such as the architecture described of FIG. 1. Additionally, there is no refrigerant charge imbalance issue because a system volume in cooling mode and heating mode remains substantially identical. Further, the heat pump system 120 may include only two heat exchangers and only one expansion device.

Figure 4:
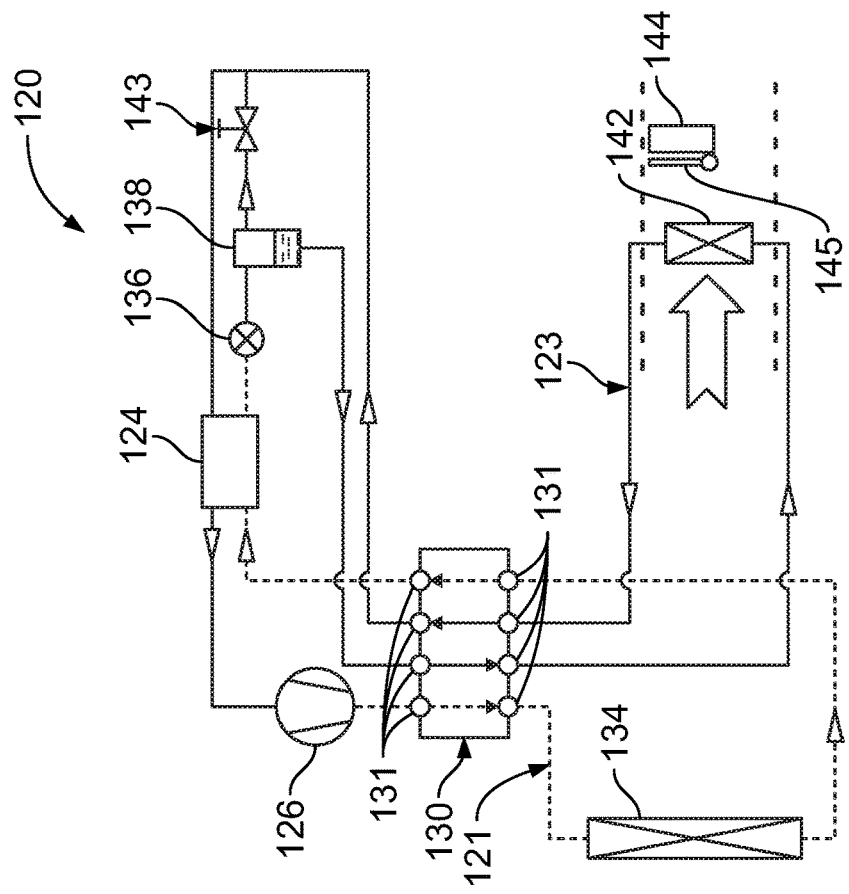
FIG. 4 is a schematic representation of the vehicle heat pump system of FIG. 2 shown operating in a first mode.

FIG. 4 illustrates an example of operation of a cooling mode of the heat pump system 120. When the heat pump system 120 is operating in a cooling mode, the eight-way valve 130 may be in a first position and direct the refrigerant to an outside heat exchanger 134 for thermal communication with ambient air. A first thermal portion 121 and a second thermal portion 123 operate with components of the heat pump system 120 to manage thermal conditions of the vehicle. In the cooling mode, the first thermal portion 121 may be a high pressure portion and the second thermal portion 123 may be a low pressure portion. Refrigerant may flow through the first thermal portion 121 and the second thermal portion 123. In the cooling mode, the outside heat exchanger 134 may operate as a condenser to move heat outside of the vehicle. The refrigerant may then pass through the eight-way valve 130 en route to the heat exchanger 124. An expansion device 136 may convert the refrigerant to a mixture of liquid and vapor prior to entering the flash tank 138 due to a pressure drop. The flash tank 138 may separate the liquid and mixture portions from one another and direct the liquid portion via the eight-way valve 130 to a cabin heat exchanger 142. A control valve 143 may operate to bypass the vapor refrigerant to emerge with the outlet refrigerant from the evaporator and balance pressures of the refrigerant.

The components of the heat pump system 120 may operate to adjust a temperature of the refrigerant. For example, for R134a refrigerant, dotted lines along the thermal portions may indicate a refrigerant temperature of approximately 100° C. to 120° C. and a high-pressure state. Solid lines along the thermal portions may indicate a refrigerant temperature of approximately 1° C. to 8° C. and a low-pressure state.

In the cooling mode, the cabin heat exchanger 142 may operate as an evaporator where the liquid refrigerant absorbs heat from incoming air. The cooled air is then supplied to the cabin. Refrigerant out of the cabin heat exchanger 142 may flow back to the eight-way valve 130 and merge with the vapor portion of the refrigerant mixture from the flash tank 138. The combined vapor and liquid refrigerant may then pass through the heat exchanger 124 and travel back to the compressor 126 to complete a cycle.

By receiving refrigerant in liquid state, the cabin heat exchanger 142 may demonstrate increased efficiency due to improved refrigerant distribution in a header of the cabin heat exchanger 142 and a reduced pressure drop across the cabin heat exchanger 142.

An airside heater 144, such as a PTC heater, may operate with two primary functions. The first function relates to providing supplemental heat at low temperatures when the system is not able to provide sufficient heat to a vehicle cabin. The second function relates to system dehumidification and reheating modes. The airside heater 144 may operate to warm air prior to supplying the air to the vehicle cabin. In the cooling mode, the heater 144 may be turned off and a blend door 145 may be closed.

Figure 5:
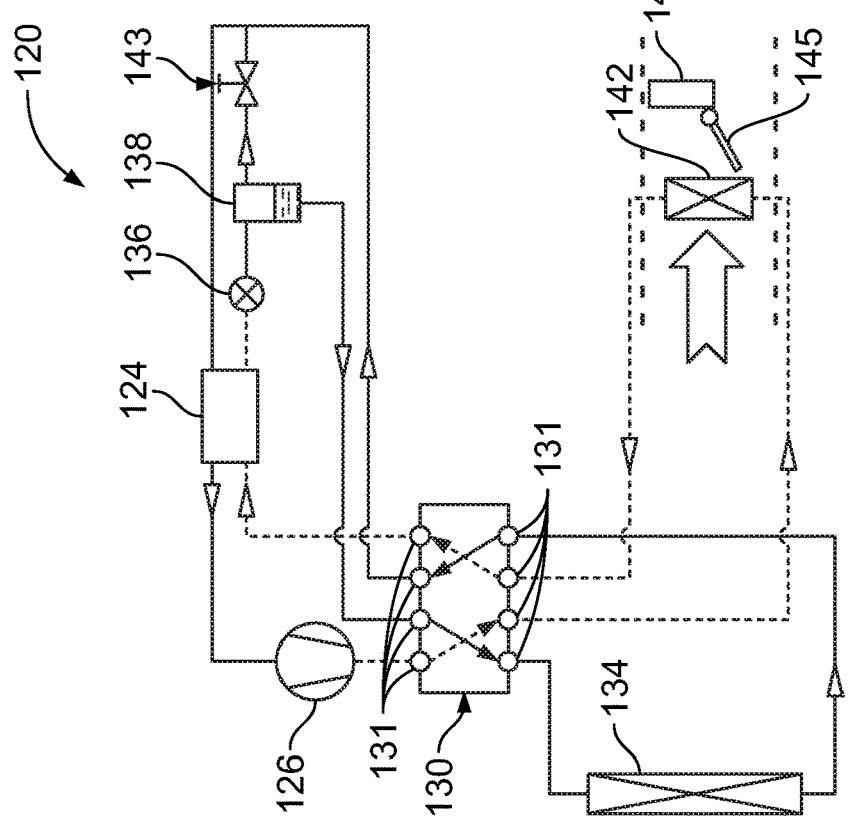
FIG. 5 is a schematic representation of the vehicle heat pump system of FIG. 2 shown operating in a second mode.

FIG. 5 illustrates an example of operation of a heating mode of the heat pump system 120. The compressor 126 may operate to compress a low-pressure state of the refrigerant to a high-pressure state prior to entering the eight-way valve 130. When the heat pump system 120 is operating in a heating mode, the eight-way valve 130 may be in a second position and direct the refrigerant to the cabin heat exchanger 142. The cabin heat exchanger 142 may operate as a condenser where the high temperature refrigerant rejects heat to incoming air. The heated air is then supplied to the cabin. The cooled refrigerant out of the cabin heat exchanger 142 may be directed by the eight-way valve 130 to the heat exchanger 124.

The refrigerant may then pass through the expansion device 136 and be expanded to a mixture of vapor and liquid prior to entering the flash tank 138. The flash tank 138 may separate the liquid and mixture portions from one another and direct the liquid portion via the eight-way valve 130 to the outside heat exchanger 134. In the heating mode, the outside heat exchanger may operate as an evaporator to absorb heat from outside environment. The boiled refrigerant out of the outside heat exchanger 134 may flow back to the eight-way valve 130 and merge with the vapor portion of the mixture from the flash tank 138. The combined refrigerant may then pass through the heat exchanger 124 and travel back to the compressor 126 to complete the cycle.

Similarly, by receiving refrigerant in liquid state, the outside heat exchanger 134 may demonstrate increased efficiency due to improved refrigerant distribution in a header of the outside heat exchanger 134 and reduced pressure drop across the outside heat exchanger 134.

In the heating mode, the airside heater 144 may be turned on as a supplemental heating source if the heat pump system 120 is not able to provide sufficient capacity, for example at low ambient conditions.

Figure 6:
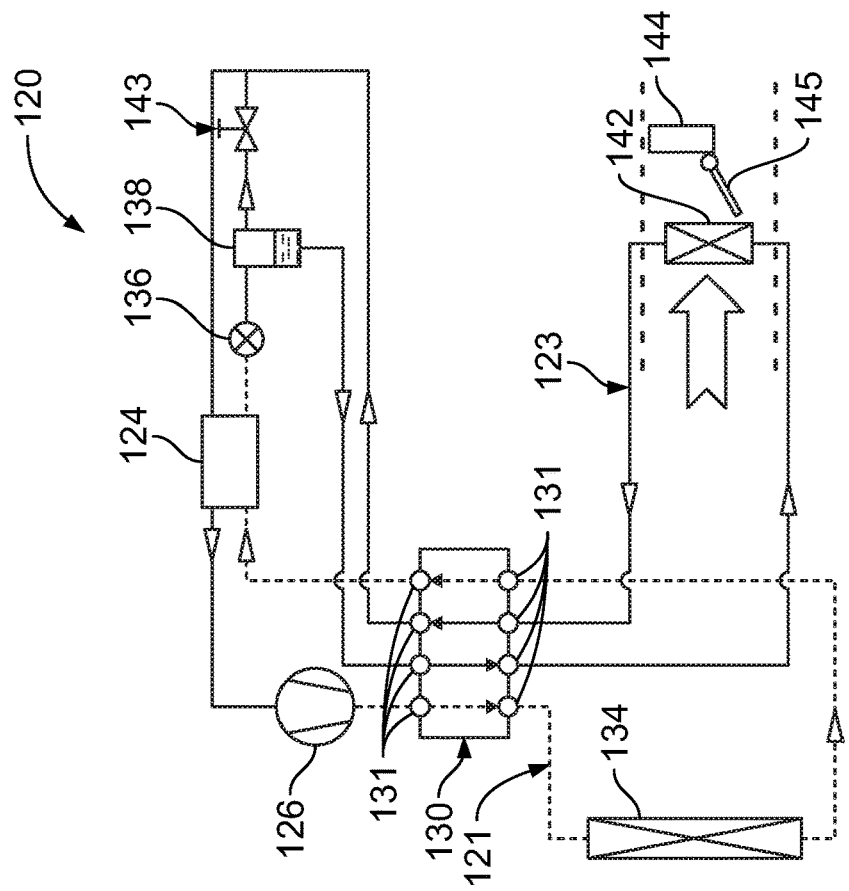
FIG. 6 is a schematic representation of the vehicle heat pump system of FIG. 2 shown operating in a third mode.

FIG. 6 illustrates an example of operation of a dehumidification and reheat mode of the heat pump system 120. In this mode, the refrigerant circuit may follow a similar pattern as described in the cooling mode to cool and dehumidify the moist air. The airside heater 144 may be turned on to heat the dried air to a predetermined comfort temperature before being supplied to the passenger compartment. A state of the blend door 145 may be adjusted to facilitate achieving a predetermined comfort temperature.

The heat pump system 120 provides several advantages over previous architectures. For example, the heat pump system 120 has a simplified architecture and control logic in comparison to previous systems through the use of the eight-way valve 130. The design eliminates at least one expansion device, one or more flow control valve, and two heat exchangers. The system performance is also improved due to improved evaporator efficiency. Furthermore, there is no refrigerant charge imbalance issue because the system volume in cooling mode and heating mode remains substantially identical.

Figure 7:
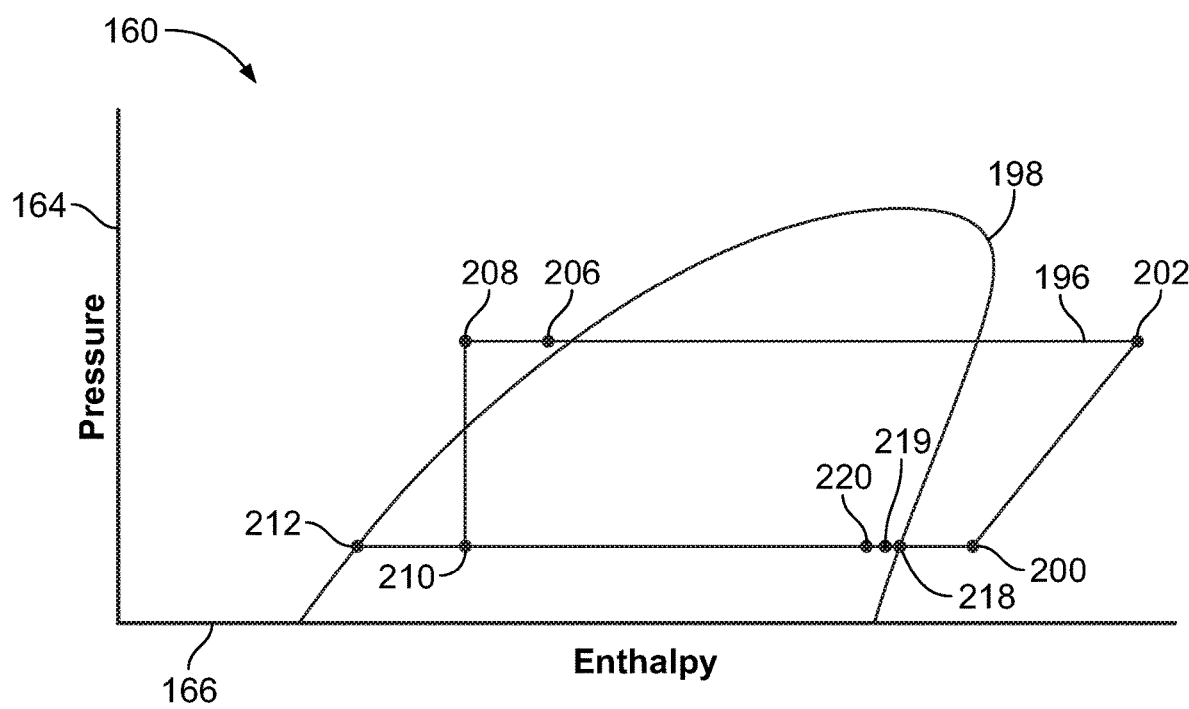
FIG. 7 is a graph illustrating an example of a pressure-enthalpy relationship for a vehicle heat pump system.

FIG. 7 is a graph illustrating an example of a pressure-enthalpy (p-h) diagram 160 of the heat pump system 120. A Y-axis 164 represents pressure and an X-axis 166 represents enthalpy. A portion of the diagram 160 below and within a region defined by the line 198 and the X-axis 166 represents a two-phase form of the refrigerant comprising liquid and vapor.

At point 200, the refrigerant is in a low pressure, vapor state and enters the compressor 126 and is compressed to a high temperature, high pressure vapor represented by point 202. A transition from point 200 to point 202 corresponds to a movement of refrigerant through the compressor 126 en route to the eight-way valve 130. In this transition, a pressure of the refrigerant in its vapor form increases. The high temperature, high pressure vapor at point 202 is cooled in the outside heat exchanger 134 in the cooling or dehumidification mode or is cooled in the cabin heat exchanger 142 in the heating mode to point 206 where the refrigerant transitions to the two-phase form and then to liquid. A transition from point 206 to 208 corresponds to a movement of the refrigerant through the heat exchanger 124 where the refrigerant is further cooled. A transition from point 208 to 210 corresponds to a movement of the refrigerant through the expansion device 136 to expand the vapor to a low pressure, vapor-liquid mixture and then is separated in the flash tank 138. In this transition, a pressure of the refrigerant drops and the refrigerant transitions to the two-phase form. A transition from point 210 to 212 and 218 corresponds to a movement of the refrigerant in the flash tank 138 where the vapor-liquid mixture (e.g. refrigerant at point 210) is separated into a pure liquid at point 212 and a pure vapor at point 218. A transition from point 212 to 220 corresponds to a movement of the refrigerant in the evaporator where it absorbs heat. In this example, the evaporator is the cabin heat exchanger 142 in the cooling or dehumidification mode and the outside heat exchanger 134 in the heating mode. Point 218 corresponds to a condition of the refrigerant moving from the flash tank 138 to the control valve 143. Point 219 corresponds to a merger of the refrigerant with saturated vapor. Point 220 corresponds to a condition of the refrigerant moving from the evaporator to the heat exchanger 124.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle heat pump system comprising:
a thermal loop including a compressor and an expansion device to reduce a pressure of refrigerant flow, and an internal heat exchanger upstream of the expansion device;
a first portion of a thermal loop including an outside heat exchanger;
a second portion of the thermal loop including a cabin heat exchanger and a flash tank upstream of the cabin heat exchanger and downstream of the expansion device to separate vapor-liquid mixture;
an eight-way valve downstream of the compressor and having a first position in which refrigerant flows within the portions in a cooling mode and a second position in which refrigerant flows within the portions in a heating mode; and
a controller to switch the eight-way valve between the first and second positions,
wherein the outside heat exchanger operates as a condenser in the cooling mode and the eight-way valve directs refrigerant flow from the outside heat exchanger to the cabin heat exchanger, wherein the outside heat exchanger operates as an evaporator in the heating mode and the eight-way valve directs refrigerant flow from the cabin heat exchanger to the outside heat exchanger, and wherein the flash tank is arranged with the eight-way valve to substantially remove vapor from the refrigerant such that the refrigerant is substantially entirely liquid when entering the cabin heat exchanger in the cooling mode or entering the outside heat exchanger in the heating mode, and the flash tank balances a pressure of the refrigerant flowing from the flash tank and the eight-way valve via a control valve downstream of the flash tank.

2. The system of claim 1 further comprising:
ara airside heater to supplement heat for delivery to a vehicle cabin in the heating mode when a sensor detects a temperature below a predetermined threshold or to reheat dehumidified air to a predetermined temperature in a dehumidification and reheat mode; and
a blend door to control temperature of air supplied to the vehicle cabin.

3. The system of claim 1, wherein the eight-way valve includes a valve housing having eight ports.

4. The system of claim 3, wherein the eight-way valve is arranged with the first portion and the second portion to influence a transitioning phase state of the refrigerant in which components of the portions are arranged with one another to influence a transitioning phase state of the refrigerant in which the refrigerant is in a liquid or liquid-vapor mixture form when flowing toward the cabin heat exchanger in the cooling mode and the refrigerant is in a vapor form when flowing toward the cabin heat exchanger in the heating mode.

5. The system of claim 1, wherein the refrigerant is one of R134a, R1234yf, R152a, R410A, hydrocarbons, ammonia, and R744.

6. The system of claim 1, wherein the thermal loop includes only two heat exchangers and only one expansion device.

7. A vehicle heat pump system comprising:
a pair of conduit portions of a thermal loop and components in fluid communication with one another including only one internal heat exchanger, a compressor, an outside heat exchanger, a cabin heat exchanger, only one expansion device, a flash tank, only one control valve, and an eight-way valve arranged within the pair of conduit portions to switch between a first position in a cooling mode and a second position in a heating mode the flash tank being upstream of the cabin heat exchanger and downstream of the expansion device in the cooling mode,
wherein refrigerant flows directly from the outside heat exchanger to the internal heat exchanger in the cooling mode and the refrigerant flowing from the outside heat exchanger in the heating mode is pressure-balanced by the only one control valve en route to the internal heat exchanger in the heating mode, and wherein the flash tank is arranged with the eight-way valve to substantially remove vapor from the refrigerant such that the refrigerant flowing to the cabin heat exchanger in the cooling mode or to the outside heat exchanger in the heating mode is substantially entirely liquid.

8. The system of claim 7, wherein refrigerant flows directly from the compressor to the outside heat exchanger in the cooling mode and the refrigerant flows directly from the compressor to the cabin heat exchanger in the heating mode.

9. The system of claim 7 further comprising an airside heater, wherein the airside heater supplements heat distribution to a vehicle cabin in the heating mode when the cabin heat exchanger operates as a condenser or reheats dehumidified air to a predetermined temperature in a dehumidification and reheat mode when the cabin heat exchanger operates as an evaporator.

10. The system of claim 7, wherein the outside heat exchanger operates as a condenser in the cooling mode and operates as an evaporator in the heating mode.

11. The system of claim 7, wherein the eight-way valve includes a valve housing having eight ports, a pair of the eight ports disposed on a first side of the valve housing located opposite a second pair of the eight ports disposed on a second side of the valve housing, and wherein four ports of the eight ports are disposed on a third side of the valve housing.

* * * * *